Sept. 18, 1923.
W. F. BULL
1,468,001
MAGAZINE CRAYON AND LEAD HOLDER
Filed June 7, 1922
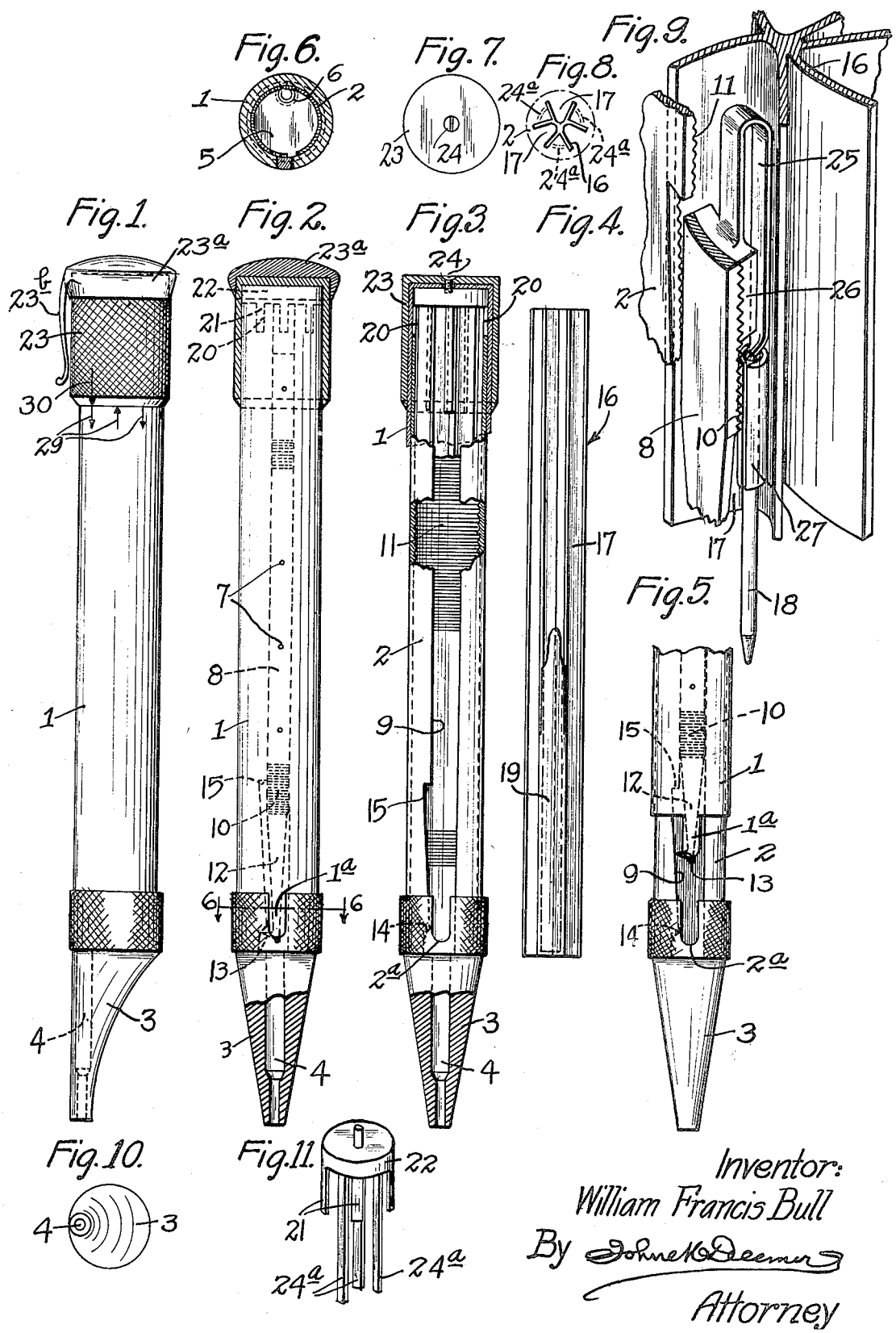
Inventor:
William Francis Bull
By John K. Deemer
Attorney Patented Sept. 18, 1923.

1,468,001

UNITED STATES PATENT OFFICE.

WILLIAM FRANCIS BULL, OF NEW YORK, N. Y.

MAGAZINE CRAYON AND LEAD HOLDER.

Application filed June 7, 1922. Serial No. 566,575.

*To all whom it may concern:*

Be it known that I, WILLIAM FRANCIS BULL, a subject of Great Britain, and resident of New York, in the county of New York and State of New York, have invented certain new and useful Improvements in Magazine Crayon and Lead Holders, of which the following is a specification.

This invention relates to magazine crayon and lead holders, the object of the invention being the provision of a device of this character which is adapted for containing a plurality of different colored marking elements, such as crayons or leads of different degrees of hardness, in such arrangement that the several marking elements may be selectively moved into position for active use and returned to inactive position when not in use.

In carrying out my invention I provide an inner tubular casing having an eccentrically arranged nozzle, an outer casing slidably mounted on said inner casing, a rotatable magazine for containing a plurality of active marking elements and a plurality of reserve marking elements, means for projecting the ends of said elements through said nozzle in prescribed lengths, means for exteriorly actuating the magazine, indicator means for gaging the rotation and other novel features, all as hereinafter fully described and specifically set forth in the appended claims.

In the accompanying drawings forming part of this specification, Figure 1 is a side view illustrating an embodiment of my improvements;

Fig. 2 is a front view showing parts in sectional elevation;

Fig. 3 is a similar view showing the major part of the outer casing broken away;

Fig. 4 is a side view of the magazine detached;

Fig. 5 is a front view of the lower part of the device;

Fig. 6 is a cross section taken on the line 6—6 of Fig. 2;

Fig. 7 is a top view of Fig. 3;

Fig. 8 is an end view of the magazine;

Fig. 9 is a fragmentary perspective view;

Fig. 10 is an end view of the nozzle; and

Fig. 11 is a perspective view illustrating a detail of the device.

In the drawings, 1 indicates a tubular outer casing which is slidably mounted on a tubular inner shell 2 having a nozzle 3 which has an eccentrically placed outlet 4 for accommodating the marking elements, the top of said nozzle 3 being closed by means of a circular plate or partition 5 having a peripheral outlet 6 which registers with the nozzle outlet 4, whereby the marking elements or leads may be projected through said outlet, as hereinafter described.

Fixed to the outer casing 1, by means of rivets 7, is an elongated plate 8 which slides within a slot 9 of the shell 2, said plate 8 being provided, on its inner face, with parallel grooves 10 which register with similar grooves 11 on the inner wall of the shell 2. Extending from the lower end of the plate 8 is a resilient member 12 having a hook 13 which, when the casing 1 is in its lowermost position, bears against a cam-surface 14 of the shell 2, a shoulder or stop 15 being provided to limit the upward movement of said hook; and the casing 1 is provided with a tongue $1^a$ which engages a recess $2^a$ of the shell 2, to maintain the casing 1 locked, when the parts are positioned for active use.

Mounted within the shell 2 and resting on the plate 5 is a magazine 16 having channels 17, for containing active leads 18, and intermediate pockets 19 for containing reserve leads.

The shell 2 has at its upper end an annular series of recesses 20 which engage relatively short prongs 21 of a rotatable plunger 22 which is fixed to the rotatable casing cap 23, and to the top of the casing 1, by means of a stud or screw 24, said plunger also being provided with relatively long arms $24^a$ whereby the magazine may be turned on its longitudinal axis. The cap 23 may be provided with an ornamental auxiliary cap $23^a$, and a clip $23^b$, for fastening the device within a pocket. Within each channel 17 is a slide comprising a bow 25 having on one arm a ribbed member 26, whose ribs are adapted for alternate engagement with the grooves 10 of the plate 8 and the grooves 11 of the shell 2, the other arm of said slide having a clip 27 for holding a lead or crayon 18. The casing 1 is provisioned with a calibrated scale 29 for registering with a pointer 30 on the cap 23.

In the operation and use of the invention the nozzle 3 is grasped in the left hand and the outer casing 1 is pulled upwardly by grasping the cap 23 with the right hand, the tubular casing 1 sliding on the shell 2 until the hook 13 contacts with the shoulder on stop 15, and the prongs 21 are disengaged from the recesses 20 whereby the cap may be rotated on the casing 1 independently of the shell 2. Then the cap is turned and set into position for bringing a selected lead or crayon 18 in register over the outlet 6 of the nozzle 3, whereupon the casing 1 is moved downwardly into position shown by Fig. 2 of the drawings, with the end of the lead projected through the point of the nozzle in position ready for use. When the pencil is not in use the lead may be retracted by repeating the operation and setting the pointer 30 in a neutral position relative to the outlet 6.

While I have illustrated and described a fair example of my invention, I do not wish to confine myself to the specific details shown, as I may employ such variations of mere detail as may fall within the scope of the appended claims.

Having thus described my invention, what I claim as new and desire to secure by Letters Patent, is:—

1. In a magazine crayon or lead holder, a slidable outer tubular casing, an inner tubular shell having a nozzle with an eccentrically positioned outlet, a rotatable magazine mounted within said shell, and exterior means for operating said outer casing and independently turning said magazine.

2. In a magazine crayon or lead holder, a slidable outer tubular casing, an inner tubular shell having a nozzle with an eccentrically positioned outlet, a magazine for containing a plurality of leads, exterior means for operating said outer casing and independently turning said magazine, and indicator means for gaging the movement of said magazine.

3. In a magazine crayon or lead holder, a slidable outer tubular casing, an inner tubular shell having a nozzle with an eccentrically positioned outlet, a rotatable magazine having reserve pockets, exterior means for operating said outer casing and independently turning said magazine, and indicator means for gaging the movement of said magazine.

4. In a magazine crayon or lead holder, a slidable outer tubular casing, an inner tubular shell having a nozzle on its lower end provided with an eccentrically positioned outlet and an open upper end having an annular series of recesses, and a magazine mounted in said inner shell, said magazine having a plurality of channels for containing leads or crayons and intermediate pockets for containing reserve leads or crayons, and a cap rotatable on said outer casing, and a plunger fixed to said cap and having a plurality of depending short prongs for engaging the recess of said shell and a plurality of relatively long prongs for engaging the channels of the magazine, and indicator means for gaging the movements of said magazine.

5. In a magazine crayon or lead holder, a slidable outer tubular casing having a fixed member provided with a plurality of grooves, and an inner tubular shell having a plurality of grooves registering with said first named grooves, and a magazine for containing a plurality of leads, and a lead carrying device having means for engaging said grooves, whereby said carrying device may alternately engage said grooves for the purpose of projecting leads in arbitrarily selected extended lengths.

Signed at New York, in the county of New York and State of New York, this 3rd day of April, A. D., 1922.

WILLIAM FRANCIS BULL.